United States Patent
Nishikata et al.

(10) Patent No.: US 6,815,851 B2
(45) Date of Patent: Nov. 9, 2004

(54) MOTOR, TERMINAL ASSEMBLY FOR THE MOTOR, AND ELECTRICAL APPARATUS HAVING THE MOTOR

(75) Inventors: Toshiyuki Nishikata, Tottori (JP); Hideshi Fukutani, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 307 days.

(21) Appl. No.: 10/131,942

(22) Filed: Apr. 25, 2002

(65) Prior Publication Data

US 2002/0175575 A1 Nov. 28, 2002

(30) Foreign Application Priority Data

Apr. 27, 2001 (JP) ........................................ 2001-131435

(51) Int. Cl.⁷ ................................................ H02K 7/00
(52) U.S. Cl. ...................................... 310/67 R; 310/71
(58) Field of Search ............................... 310/67 R, 71, 310/217, 89, 91, 254, 260

(56) References Cited

U.S. PATENT DOCUMENTS 5,705,866 A * 1/1998 Oguchi ...................... 310/67 R
5,949,613 A * 9/1999 Moir et al. .............. 360/99.08

FOREIGN PATENT DOCUMENTS

| JP | 60022437 A | * | 2/1985 | ............ H02K/5/00 |
| JP | 63-156567 | | 10/1988 | |
| JP | 07-59288 | | 3/1995 | |
| JP | 2534683 | | 2/1997 | |

* cited by examiner

Primary Examiner—Thanh Lam
(74) Attorney, Agent, or Firm—RatnerPrestia

(57) ABSTRACT

A motor which includes a core having two or more coiled teeth; a base to which the core is secured; and a terminal assembly secured to the base. The terminal assembly has lands for attaching coil ends, and is secured to the base by welding. This terminal assembly is configured by assembling at least next three components: an upper terminal holder which is an insulator; a terminal which is a conductor; and a lower terminal holder which is an insulator. This structure facilitates the assembly and improves reliability

21 Claims, 4 Drawing Sheets

MOTOR, TERMINAL ASSEMBLY FOR THE MOTOR, AND ELECTRICAL APPARATUS HAVING THE MOTOR

FIELD OF THE INVENTION

The present invention relates to a motor installed in an electrical apparatus, and more particularly to terminal assemblies for attaching an end of a coil wound around a stator core of the motor.

BACKGROUND OF THE INVENTION

In general, a brushless motor includes a stator substrate for securing a stator, and this stator substrate typically has the next structure. The stator substrate is configured with a so-called printed wiring board which includes a base typically made of an iron sheet; an insulating layer covering the base; a conductive layer typically made of copper foil patterned on the insulating layer; and a resist layer covering the conductive layer and insulating layer. In the conventional brushless motor, a motor coil end is soldered to this printed wiring board.

Another conventional brushless motor that does not use a printed wiring board as described above employs a metal sheet as the substrate to which the stator core is secured. A conductive pattern having a raised portion with groove is formed on this metal substrate. The stator core around which coils are wound via insulators is secured onto the substrate, and each coil end is attached to the groove on the conductive pattern, typically by press fitting. This structure is disclosed in Japanese Laid-open Patent No. H7-59288.

In a conventional step motor, the coiled core and terminal assembly to which the coil end is connected are resin-molded. Resin molding enables the placing of a housing case to cover the entire motor rim and secures the terminal assembly onto the housing case. This structure is disclosed in Japanese Utility Model No. 2534683.

The above structure using the printed wiring board is advantageous for a brushless motor which require a sensor attachment. In particular, this structure is effective for a case requiring complex wiring patterns. However, such a printed wiring board is expensive, and it is difficult to provide a step on the substrate due to its structure. Accordingly, the brushless motor employing the printed wiring board is limited to flat shapes. Moreover, this structure requires a special emphasis on reliability including avoiding damage to a board surface.

The motor employing a substrate on which conductive patterns are formed by processing a metal sheet as disclosed in Japanese Laid-open Patent No. H7-59288 has the following disadvantage. The shape of the substrate needed for securing a core becomes extremely complicated. In order to maintain the rigidity needed to endure impacts and vibration, the substrate requires a certain thickness in addition to a complicated substrate shape, which is unsuitable for thin motors. Moreover, processing of the substrate is relatively difficult, and thus the accuracy of the substrate itself is not easily assured. Accordingly, this type of motor has a considerable disadvantage to be used in small precision motors requiring strict accuracy. The method of securing a coil end to the raised portion with a groove is also unsuitable for a small and thin precision motor due to the height of the raised portion and the space between teeth of the stator core.

In a brushless motor, unlike the step motor, it is impractical and costly to cover the entire outer rim, including the terminal assembly, by resin molding. When using solder to attach the coil end in the terminal assembly with a sheet terminal, it is difficult to control the solder volume. Accordingly, this type of the terminal assembly is unsuitable for the small precision motor which do not have sufficient space allowance.

SUMMARY OF THE INVENTION

The present invention addresses the above disadvantages, and aims to offer a motor having a terminal assembly which only requires a small connection area, this terminal assembly in the motor, and an electrical apparatus which employs this motor.

The motor of the present invention has a core with two or more coiled teeth, a base for securing the core, and lands for attaching coil ends, and includes the terminal assembly which is secured to the base by welding.

The terminal assembly of the present invention includes an upper terminal holder which is an insulator, a terminal which is a conductor, and a lower terminal holder which is also an insulator. The terminal assembly of the present invention is configured by assembling at least the above three components.

The electrical apparatus of the present invention includes a casing and a motor installed in the casing. This electrical apparatus has the above motor structure and the above terminal assembly structure.

The above structures offer a motor with an inexpensive and easily assembled terminal assembly having a small connection area, the terminal assembly, and an electrical apparatus employing this motor.

DETAILED DESCRIPTION OF PREFERRED EMBODIMENT

Exemplary embodiments of the present invention are described below with reference to drawings.

First Exemplary Embodiment

Figure 1A:
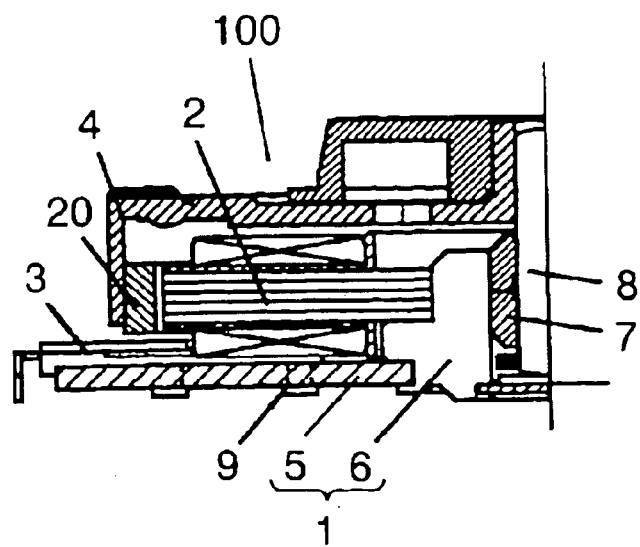
FIG. 1A is a section view of a motor in accordance with a first exemplary embodiment of the present invention.
Figure 1B:
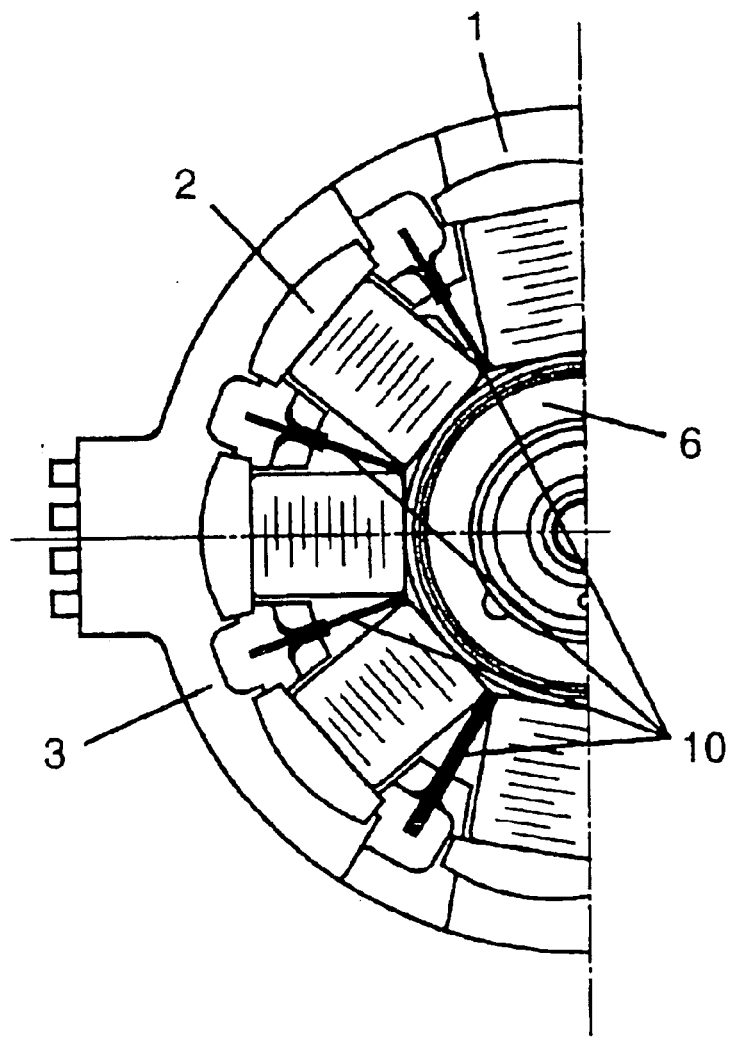
FIG. 1B is a plan view of a stator of the motor in accordance with the first exemplary embodiment of the present invention.
Figure 2A:
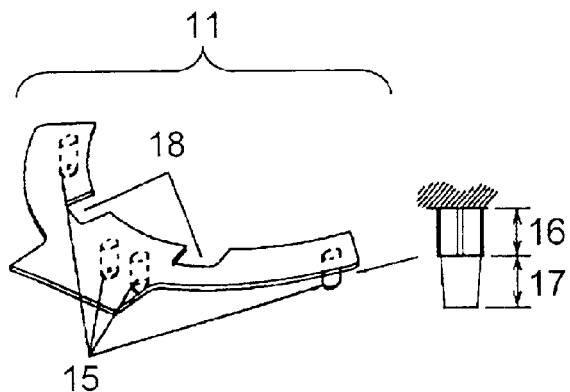
FIG. 2A is an explanatory chart illustrating an upper terminal holder of the motor in accordance with the first exemplary embodiment of the present invention.
Figure 2B:
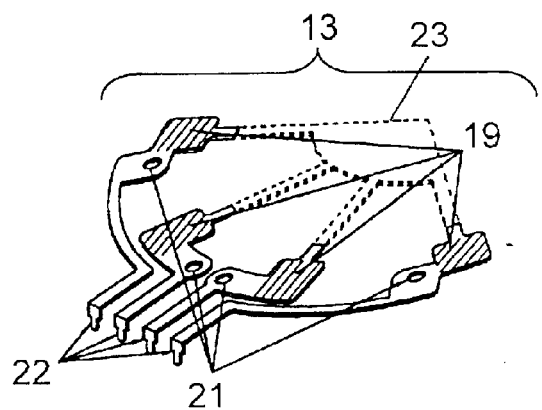
FIG. 2B is an explanatory chart illustrating a terminal of the motor in accordance with the first exemplary embodiment of the present invention.
Figure 2C:
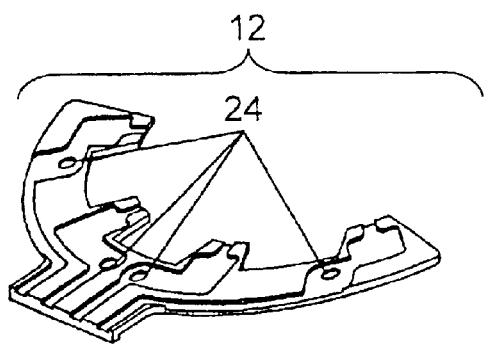
FIG. 2C is an explanatory chart illustrating a lower terminal holder of the motor in accordance with the first exemplary embodiment of the present invention.
Figure 2D:
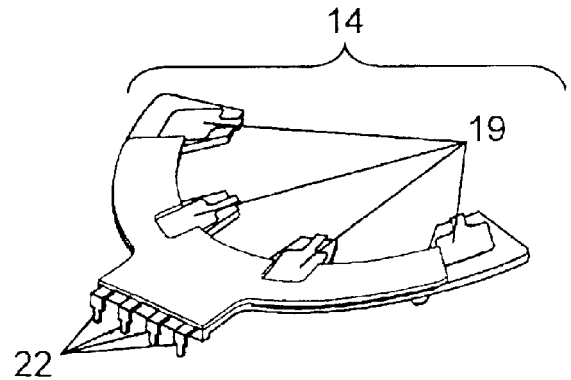
FIG. 2D is an explanatory chart illustrating a terminal assembly of the motor in accordance with the first exemplary embodiment of the present invention.

FIG. 1A is a section view of a motor and FIG. 1B is a plan view of a stator of the motor in a first exemplary embodiment of the present invention. FIG. 2A is an explanatory chart illustrating an upper terminal holder of the motor; FIG. 2B is an explanatory chart of a motor terminal; FIG. 2C is an explanatory chart of a lower terminal holder of the motor; and FIG. 2D is an explanatory chart of a terminal assembly of the motor.

In FIGS. 1A and 1B, brushless motor 100 includes base 1, coiled stator core 2, terminal assembly 3, and rotor assembly 4.

Base 1 has board 5 and metal housing 6 fixed to board 5. This metal housing 6 holds bearing metal 7. Shaft 8 of rotor assembly 4 is inserted into bearing metal 7. An inner wall of rotor magnet 20 of rotor assembly 4 and an outer wall of core 2 face each other with a radial gap in between. Attraction and repulsion occur between core 2 and a magnetic pole of rotor magnet 20 by applying current to wires coiled around core 2. As a result, rotor assembly 4 rotates while shaft 8 journals on bearing metal 7.

In this exemplary embodiment, board 5 is made by pressing a metal sheet. As shown in the Figures, metal housing 6 to which core 2 is attached is fixed onto board 5 in base 1. Alternatively, a fixing area may be processed on the board by pressing, and the core may be directly fixed onto this fixing area.

Board 5 is also provided with two or more holes 9 for securing terminal assembly 3. Protrusions on terminal assembly 3 inserted into these holes 9 are secured by welding.

In the case of a three-phase motor, as shown in the Figure, core 2 in which each wire is wound around each tooth is configured to draw out coil end 10 between adjacent teeth. After positioning the center of four coil ends 10 to the center of terminal assembly 3 as shown in FIG. 1B, terminal assembly 3 is fixed onto base 1 by press-fitting or bonding.

Next, the terminal assembly is detailed with reference to FIGS. 2A to 2D.

FIG. 2A is an upper terminal holder, FIG. 2B is a terminal, FIG. 2C is a lower terminal holder, and FIG. 2D is a terminal assembly. Upper terminal holder 11 and lower terminal holder 12 are made by molding an insulating material, such as synthetic resin, into a predetermined shape. Terminal 13 is made of a conductor such as iron and copper, and formed into a predetermined shape. Terminal assembly 14 (reference numeral 3 in FIG. 1) is configured by assembling these three components.

As shown in FIG. 2A, upper terminal holder 11 has two or more protrusions 15. As shown in FIG. 2B, terminal 13 has two or more holes 21 at positions corresponding to protrusions 15. As shown in FIG. 2C, lower terminal holder 12 has two or more holes 24 at positions also corresponding to protrusions 15. Each protrusion 15 passes through hole 21 and hole 24, and is fitted to hole 9 on base 1 in FIG. 1. This enables terminal assembly 14 to be secured onto base 1. As shown in FIG. 2A, each protrusion 15 comprises rib 16 and welding part 17 for positioning terminal assembly 14 against base 1 and assuring holding strength.

In the first exemplary embodiment, terminal assembly 14 is attached to base 1 by welding. This is beneficial cost-wise compared to adhering, because welding does not require any additional material such as adhesive. It is also extremely preferable time-wise because welding can be rapidly completed. Furthermore, welding is also preferable compared to press fitting because welding demonstrates extremely stable bonding strength.

Upper terminal holder 11 has two cavities 18 for restricting the soldering area when the coil end is soldered onto terminal 13. These cavities 18 allow solder volume to be controlled during soldering. The width of these cavities 18 in the circumferential direction is smaller than the width of land 19 on terminal 13 where the coil end will be soldered, and also smaller than the tooth interval of coiled core 2. The radial length of these cavities 18 from the center of shaft 8 to the outer diameter (bottom of the cavity) is smaller than the length (inner diameter) from the center of shaft 8 to the inner wall of rotor magnet 20. This cavity 18 enables the soldering area on terminal 13 to be restricted and also assures minimal connection area. This configuration thus allows solder volume to be controlled when the coil end is soldered onto land 19 of terminal 13. Accordingly, a solder contact with rotor assembly 4 or core 2 is preventable, and a printed wiring board may be employed as a stator board also in a small precision motor.

In FIG. 2C, lower terminal holder 12 is slightly larger than terminal 13 so as to position terminal 13, and has a groove with the same shape as terminal 13. This greatly facilitates assembling of the terminal: terminal 13 is simply fitted to the groove. In addition, the position of terminal 13 is unlikely to deviate after assembly. Furthermore, terminal 13 does not deviate when experiencing vibration, demonstrating high reliability.

In FIGS. 2B and 2D, terminal 13 has lands 19 for soldering coil ends, and each land 19 has a far larger area than the coil end. Terminal 13 also has pins 22 for connecting the motor to an external part. These pins 22 may be bent, as shown in FIG. 2B, or used straight, to match the style of the external connection. The pin shape and pin pitch may also be processed to a predetermined shape and size to match the style of the external connection. Terminal 13 is an integral component indicated with a dotted line before assembly, and is cut to a solid line after assembling the terminal. This process facilitates assembling of the terminal assembly, drastically reducing assembly time.

Second Exemplary Embodiment

Figure 3A:
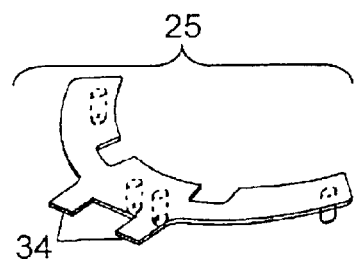
FIG. 3A is an explanatory chart illustrating an upper terminal holder of a motor in accordance with a second exemplary embodiment of the present invention.
Figure 3B:
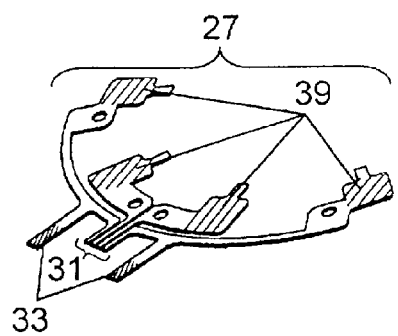
FIG. 3B is an explanatory chart illustrating a terminal of the motor in accordance with the second exemplary embodiment of the present invention.
Figure 3C:
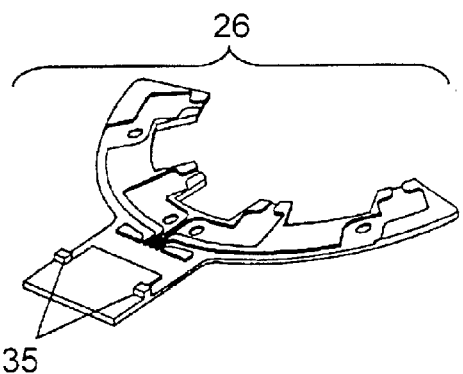
FIG. 3C is an explanatory chart illustrating a lower terminal holder of the motor in accordance with the second exemplary embodiment of the present invention.
Figure 3D:
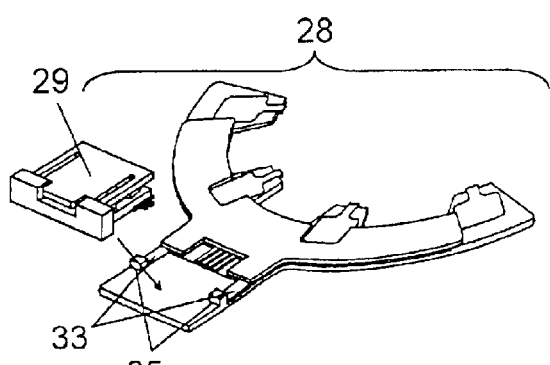
FIG. 3D is an explanatory chart illustrating a terminal assembly of the motor in accordance with the second exemplary embodiment of the present invention.
Figure 3E:
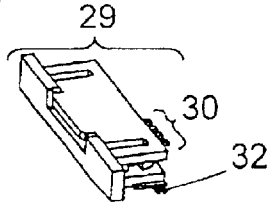
FIG. 3E is an explanatory chart illustrating an example of a connector for connecting a flexible printed board (FPC) for surface mounting/a flexible flat cable (FFC).

FIG. 3A is an explanatory chart illustrating an upper terminal holder of the motor in the second exemplary embodiment of the present invention. FIG. 3B is an explanatory chart illustrating a terminal of the motor, and FIG. 3C is an explanatory chart illustrating a lower terminal holder of the motor. FIG. 3D is an explanatory chart illustrating a terminal assembly of the motor, and FIG. 3E is an explanatory chart illustrating an example of a connector for connecting a flexible printed board for surface mounting/a flexible flat cable.

The second exemplary embodiment describes the case of attaching a commercially available connector 29 for connecting the flexible printed board for surface mount/flexible flat cable (hereinafter referred to as a general connector). As in the first exemplary embodiment, terminal assembly 28 comprises three components: upper terminal holder 25, lower terminal holder 26, and terminal 27.

Points differing from those in the first exemplary embodiment are described next.

Terminal 27 has first lands 39 for attaching the coil ends, second lands 31 suited for terminal 30 of general connector 29, and third lands 33 for soldering connector mounting clamp 32.

Each of two lands 33 is respectively connected to lands at both sides of lands 31. This makes it possible to configure a component for fixing mounting clamp 32 integrally with terminal 27 without providing it separately, thus reducing the number of components.

If a mounting clamp is attached in parallel at both sides of terminal 30 in the connector, the only change needed is to make the lands at both sides of lands 31 larger for attaching both terminals at both sides of terminal 30 and the mounting clamp. Face 34 of upper terminal holder 25 acts to restrict the soldering area for controlling the solder volume on lands 33 for soldering. At the same time, face 34 acts to position connector 29 during attachment. Lower terminal holder 26 has protrusions 35 for positioning connector 29.

The above structure enables the attachment of the connector even to the terminal assembly in the same way as commonly used in a printed wiring board. Electrical coupling or signal transmission is established between the motor and the external part by typically connecting a flexible flat cable to this connector. Moreover, the terminal assembly in the present invention has positioners (protrusions) which are not provided on printed wiring boards. Accordingly, the second exemplary embodiment demonstrates better reliability by preventing connection failure which may typically occur by deviation of the connector.

Third Exemplary Embodiment

Figure 4:
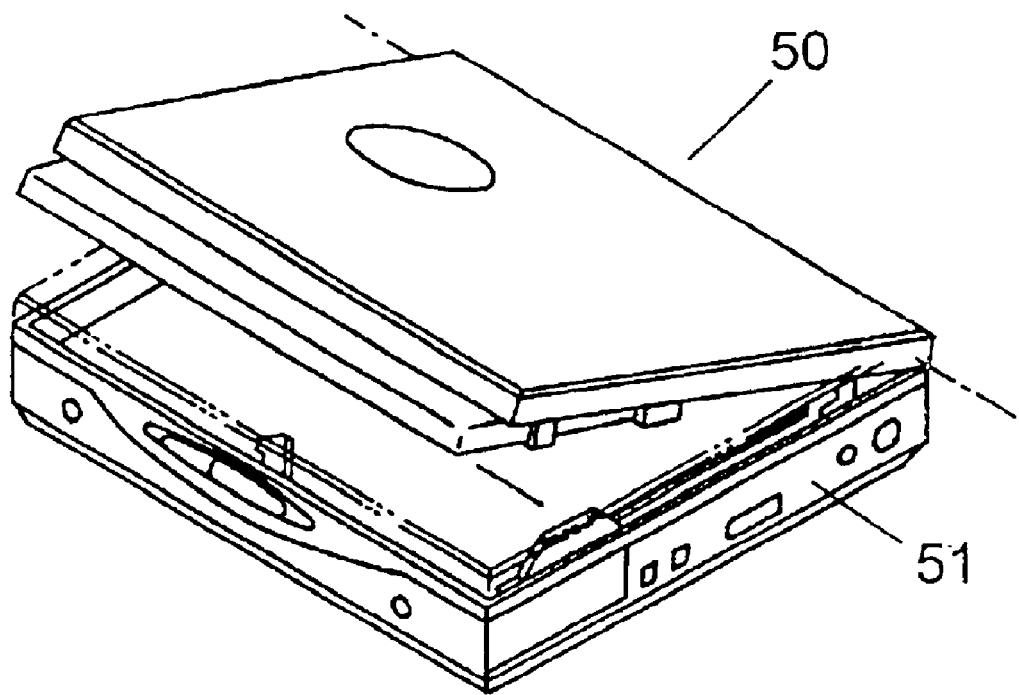
FIG. 4 is an external view of an electrical apparatus in which the motor of the present invention is installed in accordance with a third exemplary embodiment of the present invention.

FIG. 4 is an external view of an electrical apparatus equipped with the motor of the present invention in a third exemplary embodiment of the present invention. Specifically, the electrical apparatus is a compact disc driving apparatus.

In FIG. 4, electrical apparatus 50 has casing 51, and the motor is installed inside this casing 51. The motor is a so-called spindle motor for rotating a disk, and includes the terminal assembly described in the first or second exemplary embodiment. Electrical apparatus 50 in the third exemplary embodiment is expected to achieve the same effects as those in the first and second exemplary embodiments. The use of the motor of the present invention also offers a compact electrical apparatus with high performance.

As described above, the present invention employs a terminal assembly, instead of the conventionally used printed wiring board, for achieving functions equivalent to that of the printed wiring board. The terminal assembly of the present invention, which is configured only with molded components, connects the coil end and an external part. This enables the motor to be manufactured entirely using press processes and resin molding processes, eliminating any special processes typically involving a printed wiring board. Accordingly, the present invention is advantageous costwise compared to motors using the printed wiring board. Moreover, use of the terminal assembly of the present invention results in fewer restrictions being imposed on the base shape, which was previously limited to a flat shape when using the printed wiring board. Accordingly, the board can be embossed, bent, stepped, or protruded. The present invention thus improves the board accuracy and motor performance as well as reduction of the number of components.

The terminal assembly of the present invention controls the solder volume by providing a shape that limits the soldering area on the terminal holder. Accordingly, a conventional board having conductive patterns is applicable in the same way as the prior art, even to small precision motors without space allowance. In addition, the positioning function of the terminal holder when attaching the connector improves the reliability by preventing deviation of the connector.

In the present invention, the protrusion on the upper terminal holder are welded. Welding facilitates the relatively rapid assembly of the terminal and attachment of the terminal assembly. Accordingly, the present invention offers the terminal assembly featuring good productivity and less shape restrictions, and the motor using this terminal assembly.

The present invention also offers, by use of the motor of the present invention, compact electrical apparatuses with high performance.

What is claimed is:

1. A motor comprising:
    a core having a plurality of coiled teeth;
    a base to which said core is secured; and
    a terminal assembly having a land for attaching a coil end, said terminal assembly being secured to said base by welding,
    said terminal assembly is configured by assembling:
    an upper terminal holder which is an insulator;
    a terminal which is a conductor; and
    a lower terminal holder which is an insulator.

2. The motor as defined in claim 1, wherein said upper terminal holder has a protrusion for securing said terminal assembly onto said base by welding.

3. The motor as defined in claim 1, wherein said upper terminal holder has a shape for restricting a soldering area on said terminal.

4. The motor as defined in claim 1, wherein said lower terminal holder has a groove for fitting said terminal.

5. The motor as defined in claim 1, wherein said terminal comprises:
    a pin for connecting to an external part; and
    a land for attaching said coil end.

6. The motor as defined in claim 1, wherein said terminal comprises:
    a first land for attaching said coil end;
    a second land for attaching a connector terminal for external connection; and
    a third land for fixing a mounting clamp for said connector.

7. The motor as defined in claim 6, wherein said lower terminal holder has a protrusion for positioning said connector.

8. A terminal assembly for a motor comprising a core having a plurality of coiled teeth; a base to which said core is secured; and said terminal assembly secured to said base by welding; wherein said terminal assembly is configured by assembling at least next three components:
    an upper terminal holder which is an insulator;
    a terminal which is a conductor; and
    a lower terminal holder which is an insulator.

9. The terminal assembly as defined in claim 8, wherein said upper terminal holder has a protrusion for securing said terminal assembly onto said base by welding.

10. The terminal assembly as defined in claim 8, wherein said upper terminal holder has a shape for restricting a soldering area on said terminal.

11. The terminal assembly as defined in claim 8, wherein said lower terminal holder has a groove for fitting said terminal.

12. The terminal assembly as defined in claim 8, wherein said terminal comprises:

a pin for connecting to an external part; and a land for attaching a coil end.

13. The terminal assembly as defined in claim 8, where in said terminal comprises:

a first land for attaching a coil end;

a second land for attaching a connector terminal for external connection; and a third land for securing a mounting clamp of said connector.

14. The terminal assembly as defined in claim 13, wherein said lower terminal holder has a protrusion for positioning said connector.

15. A motor comprising:

a core having a plurality of coiled teeth;

a base to which said core is secured; and a terminal assembly having a land for attaching a coil end, said terminal assembly being secured to said base by welding, said terminal assembly is configured by assembling:

an upper terminal holder which is an insulator;

a terminal which is a conductor; and a lower terminal holder which is an insulator.

16. The electrical apparatus as defined in claim 15, wherein said upper terminal holder has a protrusion for securing said terminal assembly onto said base by welding.

17. The electrical apparatus as defined in claim 15, wherein said upper terminal holder has a shape for restricting a soldering area on said terminal.

18. The electrical apparatus as defined in claim 15, wherein said lower terminal holder has a groove for fitting said terminal.

19. The electrical apparatus as defined in claim 15, wherein said terminal comprises:

a pin for connecting with an external part; and a land for attaching a coil end.

20. The electrical apparatus as defined in claim 15, wherein said terminal comprises:

a first land for attaching a coil end;

a second land for attaching a connector terminal for external connection; and a third land for fixing a mounting clamp of said connector.

21. The electrical apparatus as defined in claim 20, wherein said lower terminal holder has a protrusion for positioning said connector.

* * * * *